April 26, 1966     W. F. HINDS     3,248,144

BATTERY CARRIER

Filed Sept. 18, 1964

INVENTOR.
WILLIAM F. HINDS

BY *Eckhoff and Slick*

ATTORNEYS

3,248,144
BATTERY CARRIER
William F. Hinds, Hamilton and High Sts., Palo Alto, Calif.
Filed Sept. 18, 1964, Ser. No. 397,468
1 Claim. (Cl. 294—16)

This invention relates to a carrier for batteries or the like.

Battery carriers which have heretofore been used frequently have had collars slipped over the post of the battery and this at times has resulted in injury to the battery and such carriers are notoriously insecure so that the battery may be dropped. Further, in the case of those batteries having an even number of cells wherein the terminals are both on the same side of the case, the battery tilts at a substantial angle when it is picked up by the terminals which may result in spilling acid and in any event results in carrying the battery at a clumsy angle and making it difficult to install the battery in a car. Other carriers have involved tong arrangements having metallic joints which are apt to corrode and render the carrier useless and frequently having sharp points which may injure the case of the battery.

In accordance with the present invention, a simple battery carrier is provided which gives a positive gripping action on the battery.

The carrier of the present invention does not have any metal joints so that the device is not rendered inoperative should the metal parts corrode. A further advantage of the carrier of the present invention is that it easily adjusts to batteries of any size or type by a simple hand manipulation.

Other objects and features of the invention will be apparent from the specification which follows.

In the drawings forming a part of this patent application:

Figure 3:
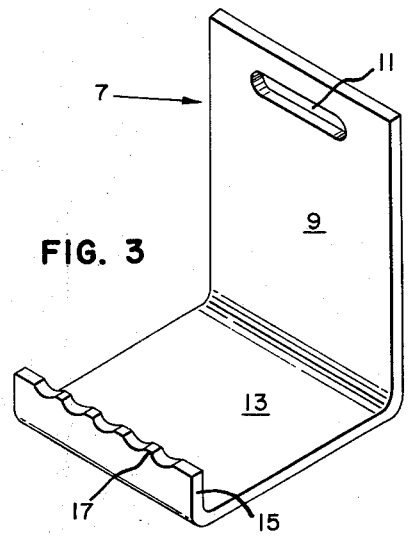
FIGURE 3 is an enlarged perspective view of one of the end members employed in the present invention.
Figure 2:
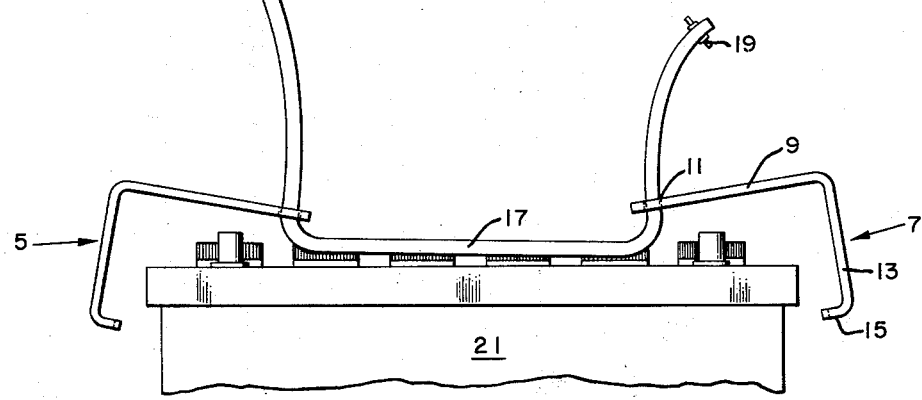
FIGURE 2 is an enlarged side elevation of the carrier of the present invention.

In accordance with the present invention two end members are employed which have been generally designated 5 and 7. Each of the end members is of general L-shape and has a horizontal arm 9 having a slot 11 therein and a vertical arm 13 having an inturned end 15 terminating in coarse teeth 17. Preferably end members 5 and 7 are made of metal although other solid materials can be used. As is apparent from FIGURE 2, the end members are identical.

Figure 1:
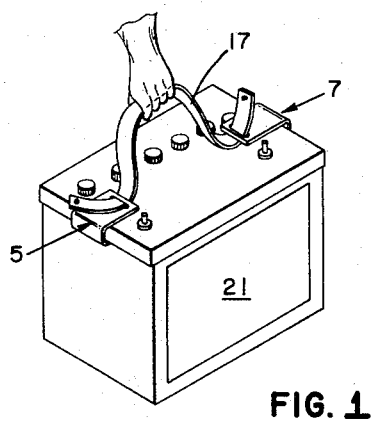
FIGURE 1 is a perspective view of the carrier of the present invention showing it in use.

A flexible strap 17 is provided which has ends passing upwardly through the slots in the end members. Preferably the extreme ends of the flexible straps 17 have rivets 19 or other means to prevent the strap from coming completely out of the end members when the device is not in use. When there is no tension on the device the strap 17 passes freely through the slots in the end members so that the members 5 and 7 can be easily spaced apart any desired distance, depending upon the size of the battery to be carried. However, when pressure is brought upwardly on the strap 17, as is shown in FIGURE 1, the strap wedges in the slots so that it will not slip through the slots. Further, as pressure is brought upwardly at the center of the strap 17 the inturned ends of the end members are caused to tilt inwardly toward each other in a gripping engagement with the battery 21 or other object placed therebetween.

It is believed apparent from the foregoing that I have prepared a simple, yet effective, battery carrier which does not contact the terminals of the battery and which results in the battery being carried in a level position.

I claim:

A battery carrier or the like comprising in combination:

(a) first and second end members;
(b) each of said end members having an L-shape comprising a horizontal arm and a downturned vertical arm;
(c) each of said horizontal arms having a slot therein;
(d) each of said downturned vertical arms having an inturned end having teeth thereon;
(e) said first and second end members being disposed with the horizontal arms toward each other whereby the teeth face inwardly;
(f) a flexible strap connecting the two end members, one end of said strap passing upwardly through one of said end members and the opposite end of said strap passing upwardly through the slot in the opposite end member; and
(g) whereby as the center portion of the strap is raised upwardly said strap will wedge in said slots and said inturned ends will be biased inwardly in gripping contact with an object therebetween.

References Cited by the Examiner

UNITED STATES PATENTS

| | | | |
|---|---|---|---|
| 1,460,730 | 7/1923 | Phelps | 294—16 |
| 1,938,158 | 12/1933 | Steele | 224—45.16 |
| 2,944,713 | 7/1960 | Beach | 224—45 |

GERALD M. FORLENZA, *Primary Examiner.*